US012572670B2

(12) United States Patent
Shafiulla

(10) Patent No.: US 12,572,670 B2
(45) Date of Patent: Mar. 10, 2026

(54) FEDERATED ACCESS CONTROL IN A MULTI-TENANT CLOUD-BASED NETWORK

(71) Applicant: SAP SE, Walldorf (DE)

(72) Inventor: Mohammed Saifulla Shafiulla, Brisbane (AU)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 18/392,533

(22) Filed: Dec. 21, 2023

(65) Prior Publication Data

US 2025/0209188 A1    Jun. 26, 2025

(51) Int. Cl.
| | |
|---|---|
| *G06F 21/60* | (2013.01) |
| *G06F 16/25* | (2019.01) |
| *G06F 21/62* | (2013.01) |

(52) U.S. Cl.
CPC ......... *G06F 21/604* (2013.01); *G06F 16/256* (2019.01); *G06F 21/6218* (2013.01); *G06F 2221/2113* (2013.01); *G06F 2221/2141* (2013.01)

(58) Field of Classification Search
CPC .. G06F 21/604; G06F 16/256; G06F 21/6218; G06F 2221/2113; G06F 2221/2141
USPC .......................................................... 726/26
See application file for complete search history.

(56) References Cited

U.S. PATENT DOCUMENTS

| | | | | | |
|---|---|---|---|---|---|
| 8,813,174 | B1 * | 8/2014 | Koeten | .................. | H04L 67/10 |
| | | | | | 713/168 |
| 9,734,466 | B2 * | 8/2017 | Cvetkovic | .............. | H04L 41/02 |
| 11,586,613 | B2 * | 2/2023 | Korpman | ............ | G06F 16/9577 |
| 11,973,810 | B2 * | 4/2024 | Bailey | ..................... | H04L 67/10 |
| 2002/0095454 | A1 * | 7/2002 | Reed | ........................ | H04L 67/55 |
| | | | | | 709/212 |
| 2006/0004856 | A1 * | 1/2006 | Shen | ......................... | G06F 8/24 |
| 2019/0014120 | A1 * | 1/2019 | Drabant | ............... | H04L 63/104 |
| 2020/0360631 | A1 * | 11/2020 | Li | ..................... | A61M 15/0003 |
| 2023/0222137 | A1 * | 7/2023 | Aucinas | ................. | G06F 21/44 |
| | | | | | 707/802 |
| 2024/0089291 | A1 * | 3/2024 | Shpilyuck | .............. | H04L 63/20 |

OTHER PUBLICATIONS

Tang, B. "Multi-Tenant Access Control for Cloud Services," Dissertation, Apr. 1, 2014, pp. 1-112.
Extended European Search Report issued in European Application No. 24210711.8-1218 mailed Feb. 24, 2025, 12 pages.

* cited by examiner

*Primary Examiner* — Taghi T Arani
(74) *Attorney, Agent, or Firm* — Mintz Levin Cohn Ferris Glovsky and Popeo, P.C.

(57) ABSTRACT

Provided herein is a method, wherein the method includes defining, based on at least one of an organization's association with an object and a user's association with the object, a data access rule; generating a notification in response to a modification to the data access rule, wherein the notification comprises one or more structured messages indicative of the modification to data access rule; transmitting, via a notification interface, the one or more structured messages to a shared access control layer to update the data access rule; federating the updated data access rule to one or more extended components; and enforcing the updated data access rule to control access to the object based on the updated data access rule.

18 Claims, 4 Drawing Sheets

300

Defining, based on at least one of an organization's association with an object and a user's association with the object, a data access rule 302

Generating a notification in response to a modification of the data access rule, wherein the notification comprises one or more structured messages indicative of the modification of data access rule 304

Transmitting, via a notification interface, the one or more structured messages to a shared access control layer to update the data access rule 306

Federating the updated data access rule to one or more extended components 308

Enforcing the updated data access rule to control access to the object based on the updated data access rule 310

Figure 1:
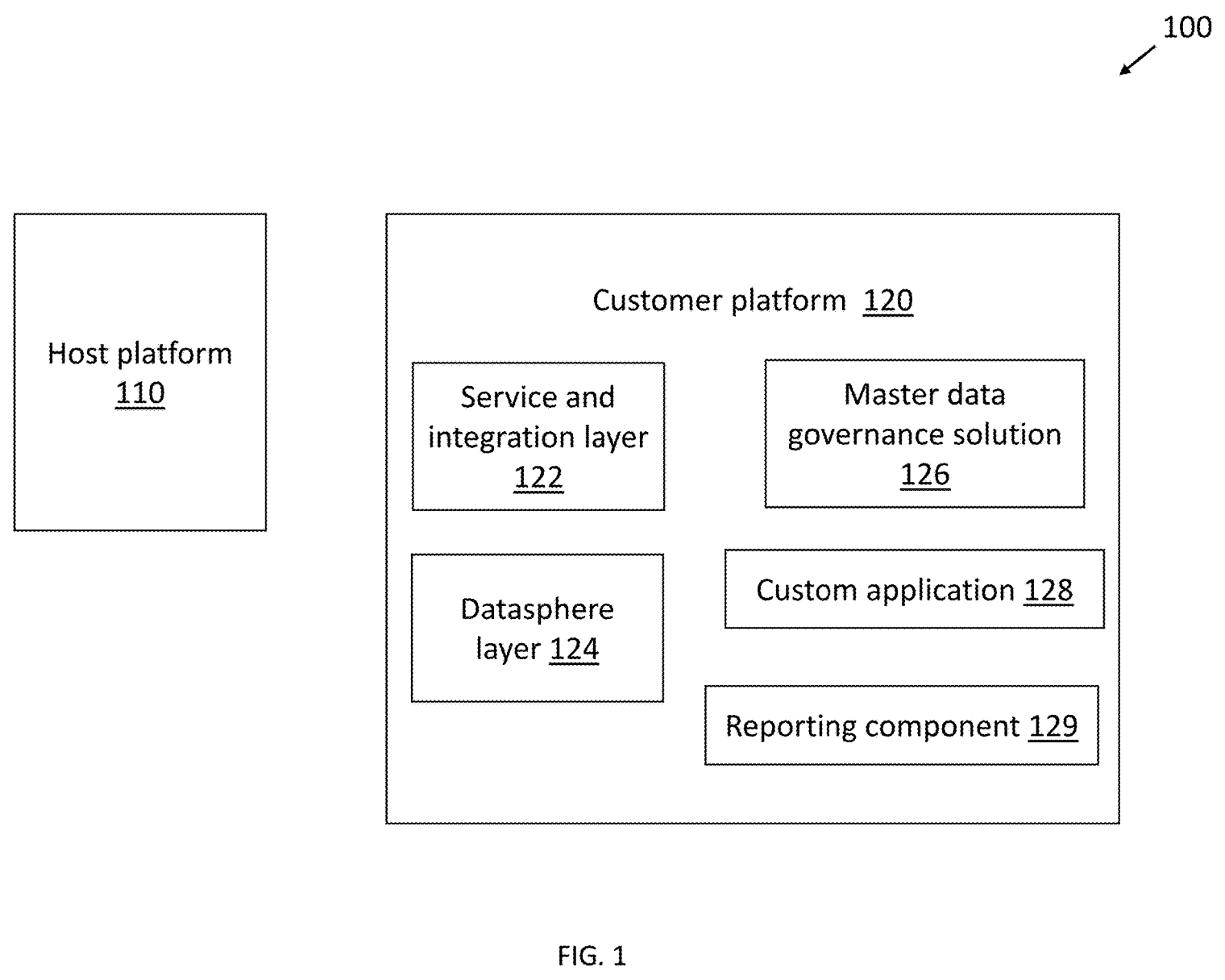

100

Customer platform 120

Service and integration layer 122

Master data governance solution 126

Datasphere layer 124

Custom application 128

Reporting component 129

Host platform 110

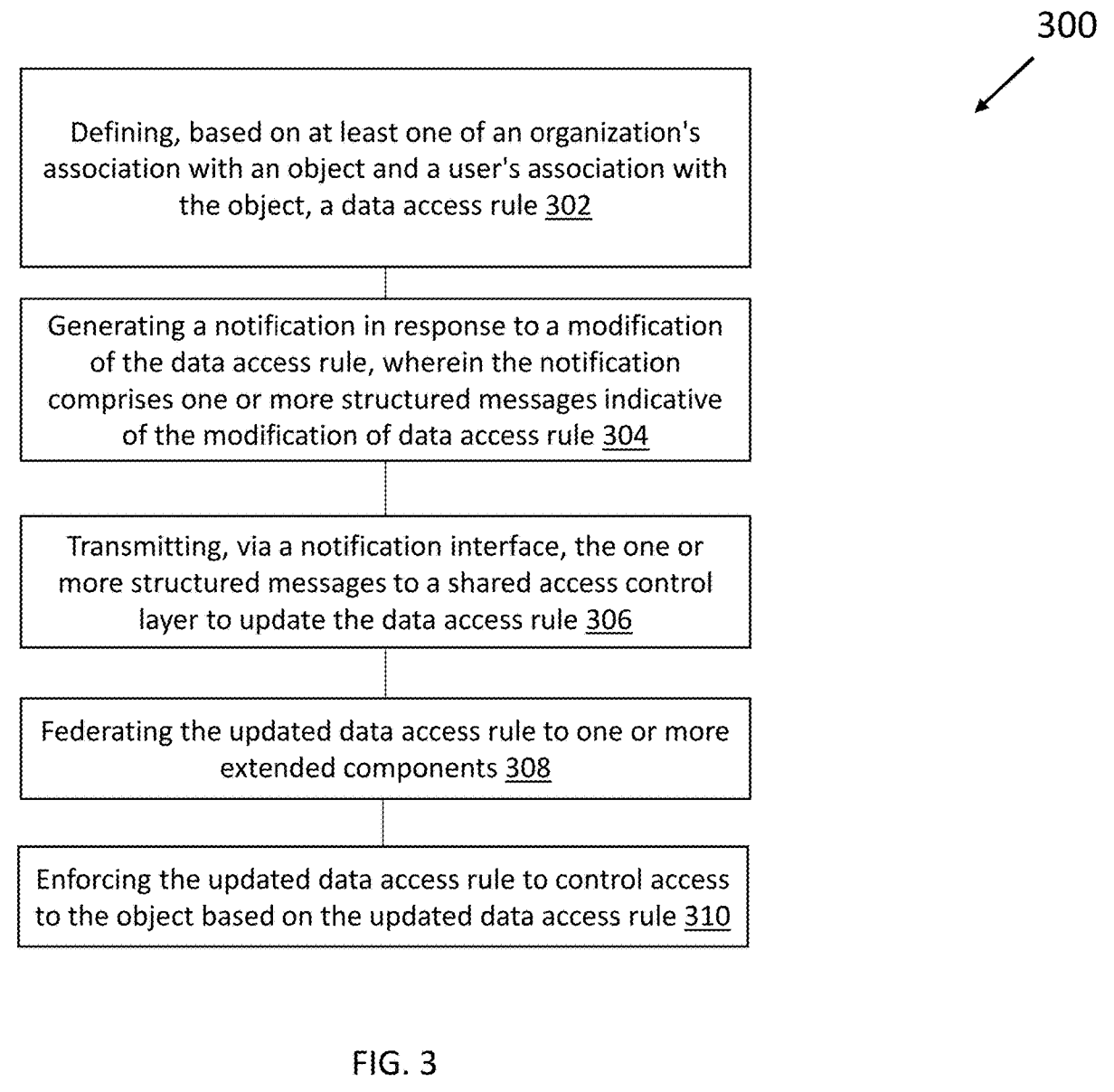

Defining, based on at least one of an organization's association with an object and a user's association with the object, a data access rule 302

Generating a notification in response to a modification of the data access rule, wherein the notification comprises one or more structured messages indicative of the modification of data access rule 304

Transmitting, via a notification interface, the one or more structured messages to a shared access control layer to update the data access rule 306

Federating the updated data access rule to one or more extended components 308

Enforcing the updated data access rule to control access to the object based on the updated data access rule 310

FIG. 3

FEDERATED ACCESS CONTROL IN A MULTI-TENANT CLOUD-BASED NETWORK

TECHNICAL FIELD

The subject matter described herein relates generally to cloud services and more specifically to federated access control in a multi-tenant cloud-based network.

BACKGROUND

In the modern era of digital transformation, businesses are increasingly leveraging cloud-based solutions to manage their operations. One such solution is the Business Network for Assets (BNAC), a public cloud-based multi-tenant network solution. BNAC provides a platform for organizations to collaborate and exchange information related to assets, creating a single version of truth for all stakeholders involved. Within such a network, access control is a pivotal aspect. Access control rules determine what information an organization or a user within an organization can access. These rules are typically based on for example an organization's association with an object (or by explicit sharing) and the user's association to the object. The complexity of these rules can increase due to cross-organization sharing of objects and user-object access rules. Furthermore, in a cloud-based solution such as BNAC, the architecture may involve discrete components. These components (which may include for example custom applications with business logic, reporting components, and master data governance solutions) may be used to extend the core network solution and deliver functionalities addressing specific business problems. These extended components may reside in a separate cloud tenant or account and may not have access to the core solution's database. Software-as-a-Service (SaaS) and Platform-as-a-Service (PaaS) models may be used in such architectures. In a SaaS model for example, the software may be hosted from a dedicated cloud tenant and consumed by one or more users over the Internet. In a PaaS model, for example, a platform may be provided to developers to build, test, and deploy applications. Both of these models may play a role in extending the functionalities of the core network solution. Moreover, Representational State Transfer (REST) based Application Programming Interfaces (APIs) and Events may be used to facilitate communication between different system components. REST is a software architectural style that defines a set of constraints to be used for creating web services. APIs (which are based on REST) may be used in cloud-based applications due to their scalability, statelessness, and ability to handle data in different formats. Overall, the management of access control in a multi-component extended business network for assets management in a cloud environment may involve various components and technologies, each with its own complexities and challenges.

SUMMARY

Systems, methods, and articles of manufacture, including computer program products, are provided for federated access control in a multi-tenant cloud-based business network in a cloud environment. In one aspect, there is provided a system. The system may include at least one data processor and at least one memory. The at least one memory may store instructions that result in operations when executed by the at least one data processor. The operations may include: defining, based on at least one of an organization's association with an object and a user's association with the object, a data access rule; generating a notification in response to a modification to the data access rule, wherein the notification comprises one or more structured messages indicative of the modification to data access rule; transmitting, via a notification interface, the one or more structured messages to a shared access control layer to update the data access rule; federating the updated data access rule to one or more extended components; and enforcing the updated data access rule to control access to the object based on the updated data access rule.

A computer-implemented method may include: defining, based on at least one of an organization's association with an object and a user's association with the object, a data access rule; generating a notification in response to a modification to the data access rule, wherein the notification comprises one or more structured messages indicative of the modification to data access rule; transmitting, via a notification interface, the one or more structured messages to a shared access control layer to update the data access rule; federating the updated data access rule to one or more extended components; and enforcing the updated data access rule to control access to the object based on the updated data access rule.

A non-transitory computer-readable medium storing instructions, which when executed by at least one data processor, result in operations including: defining, based on at least one of an organization's association with an object and a user's association with the object, a data access rule; generating a notification in response to a modification to the data access rule, wherein the notification comprises one or more structured messages indicative of the modification to data access rule; transmitting, via a notification interface, the one or more structured messages to a shared access control layer to update the data access rule; federating the updated data access rule to one or more extended components; and enforcing the updated data access rule to control access to the object based on the updated data access rule.

In some variations of the methods, systems, and non-transitory computer readable media, one or more of the following features can optionally be included in any feasible combination. In some variations, the one or more extended components comprise a custom application with logic that extends a functionality of a core system. In some variations, the one or more extended components comprise a reporting component that generates reports based on data governed by the data access rule in a core system. In some variations, the one or more extended components comprise a master data governance solution that integrates with a core system. In some variations, the notification interface comprises an event interface that triggers, in response to the modification to the data access rule, transmission of the one or more structured messages to the shared access control layer. In some variations, the shared access control layer updates the data access rule in real-time or near real-time to ensure compliance with the updated data access rule across the extended components. In some variations, the operations further include generating one or more access control lists, wherein the one or more access control lists are responsive to the one or more structured messages and reflect the updated data access rule for the object.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 depicts a block diagram illustrating an example of a system for federated access control, in accordance with some example embodiments;

FIG. 3 depicts a flowchart diagram illustrating an example of a process for federated access control, in accordance with some example embodiments.

When practical, similar reference numbers denote similar structures, features, or elements.

DETAILED DESCRIPTION

Figure 2:
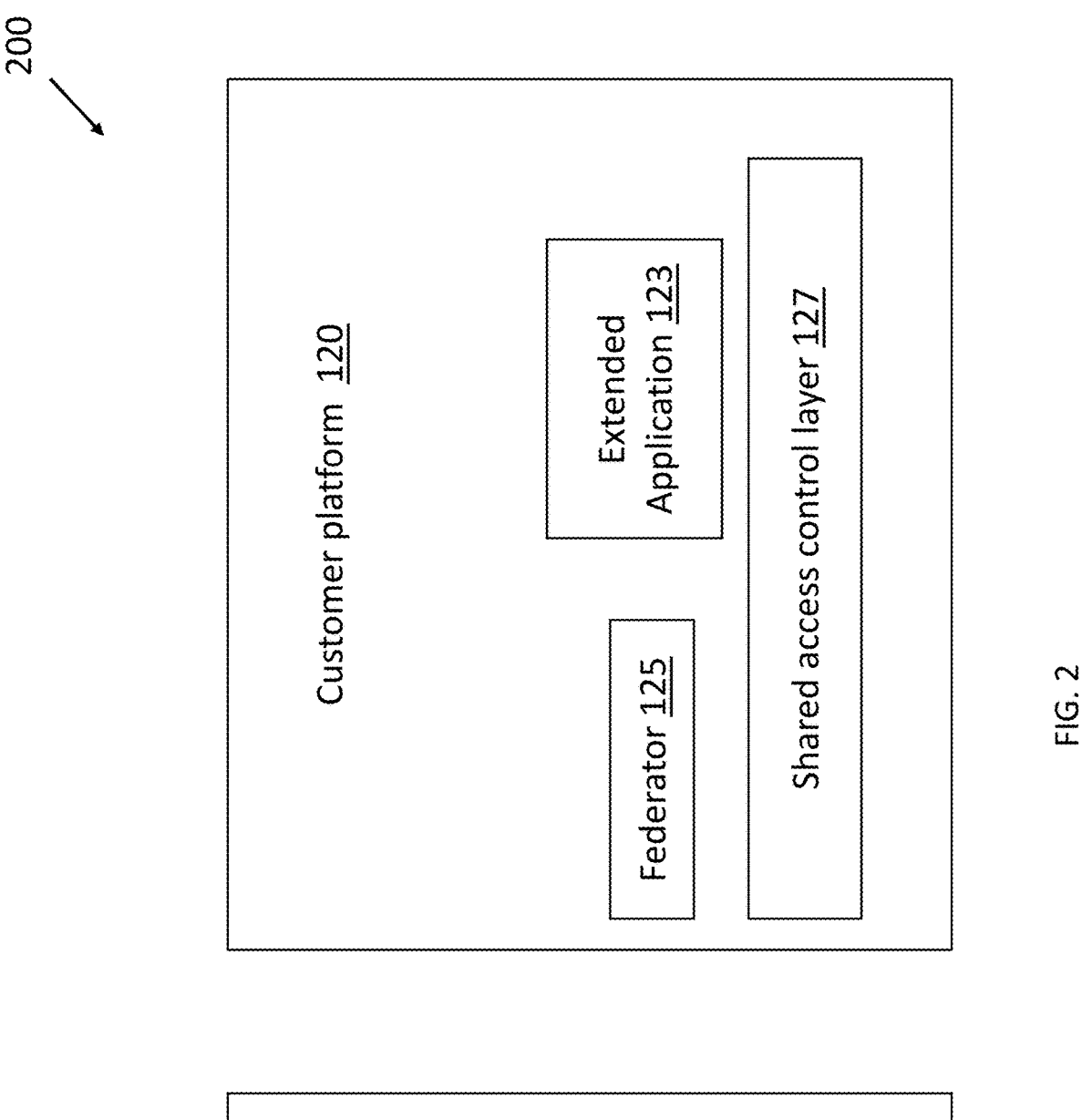
FIG. 2 depicts a block diagram illustrating another example of a system for federated access control, in accordance with some example embodiments.

As noted, a network for collaboration, such as BNAC, may operate as a public cloud-based, multi-tenant network solution that facilitates collaboration and information exchange regarding assets. When additional solutions are built upon this cloud infrastructure, the additional solutions may include discrete components that may reside in separate cloud tenants. A challenge arises because these components might not be able to directly access the core solution's database. This inability hampers the enforcement of complex data access rules, which rely on organizational and user-object associations. Therefore, this separation may create one or more problems for maintaining consistent data access control across the various components of the system. The term 'solution' refers to an application or other software functionality.

In some embodiments, there is provided federated data access control in a multi-component extended system used for assets management, for example. This method may involve defining and/or aggregating data access rules in a first system, such as a core system. The core system may be hosted on a dedicated cloud tenant, which may be a separate computing environment within a cloud infrastructure. In some embodiments, the dedicated cloud tenant may operate under a cloud infrastructure service model. In the cloud infrastructure service model, a single tenant (which can be an organization or a group within an organization) may have its own independent, dedicated instance of the cloud infrastructure. This arrangement may suggest that the tenant does not share core computational resources, such as memory, storage, or processing power, with other tenants. The data access rules are based at least in part on an organization's association with an object and a user's association with that object. The object may be a record, a data entity, or a data element stored in a database instance. For example, the data object may be managed within the network (e.g., system) for managing assets (e.g., data objects such as an asset, a document, a transactional object, a business object, or any other type of data entity.

FIG. 1 depicts a block diagram illustrating a system 100 for federated access control in a multi-tenant system, which may be hosted in a cloud platform. As shown in FIG. 1, the system 100 may comprise a host platform 110 and a customer platform 120. The host platform 110 may be responsible for defining, managing, and enforcing data access rules across various customer platforms in a multi-tenant environment. In some embodiments, the host platform 110 may host a core system. For example, the host platform 110 may provide the computational resources, services, and networking capabilities that the core system and its associated components require to operate. In some embodiments, the core system could be part of a cloud-based environment, such as the SAP HANA Cloud, Amazon Web Services (AWS), Microsoft Azure, Google Cloud Platform (GCP), IBM Cloud, and the like. In some embodiments, the host platform 110 may include the SAP HANA Cloud infrastructure, AWS infrastructure, Azure infrastructure, GCP infrastructure, IBM Cloud infrastructure, or the infrastructure of any other cloud service provider. Each platform may offer a suite of services and resources that may support the deployment and operation of the core system.

The customer platform 120 may comprise a service and integration layer 122, a datasphere layer 124, a custom application 128, a reporting component 129, and a master data governance solution 126. In some embodiments, the service and integration layer 122 may function as a central hub for communication and data exchange between the various components of the customer platform 120 and/or host platform 110. In some embodiment, the service and integration layer 122 may also offer monitoring and logging capabilities to track the performance of the services. The datasphere layer 124 may be responsible for data storage, management, and analytics. In some embodiments, the service and integration layer 122 may interact with the datasphere layer 124 to manage data flow, enforce access policies, and/or ensure integration across various system services. The custom application 128 may be a module or application that is tailored to specific processes or requirements, and it may perform extended functionalities that enhance the core capabilities of the customer platform 120.

The custom application 128 may use the data access rules in the shared access control layer to control the access to the objects by the organizations and users. This may ensure that the custom application provides the users with the information they are entitled to, while preventing unauthorized access to sensitive data. Another extended component within the customer platform 120 is a reporting component 129 that is based on data in the core system. In some embodiments, the reporting component 129 may be supported by the service and integration layer 122. The reporting component 129 may be configured to generate reports or analytics based on the data in the business network. Yet another extended component within the customer platform 120 is the master data governance solution 126 that integrates with the core system. This master data governance solution is configured to manage the master data, such as the data about the organizations, users, objects, and their relationships. The master data governance solution may use the data access rules in the shared access control layer to control the access to the master data. This may ensure that the master data governance solution provides the users with the master data they are entitled to, while preventing unauthorized access to sensitive master data. The datasphere layer 124 may manage the data entities within the system (e.g., business network) to ensure consistent application of data access rules across different components of the extended network.

FIG. 2 depicts a block diagram illustrating a system 200 for federated access control in a multi-tenant cloud-based business network, in accordance with some example embodiments. As shown in FIG. 2, the system 200 may comprise a host platform 110 and customer platform 120. As in FIG. 1, the host platform 110 may be responsible for defining, managing, and enforcing data access rules across various customer platforms in a multi-tenant environment. In some embodiments, the customer platform 120 may further include an extended application 123, a federator 125, and/or a shared access control layer 127. In some embodiments, an extended component within the customer platform 120 is the extended application 123 with logic that extends functionality of the core system. The extended application 123 may be configured to perform a specific function or process that is not covered by the core system. In other words, the extended application 123 represents a customization or an additional function at a customer platform 120 that is not provided by a core system. The extended application 123 may utilize the data access rules in the shared access control layer 127 to control the access to the objects by the organizations and users. This may ensure that the extended application 123 provides the users with the information they are entitled to, while preventing unauthorized access to sensitive data.

Another component within the customer platform 120 may be the federator 125, which may be configured to generate reports or analytics based on the data in the network. In some embodiments, the federator 125 may function as an intermediary that consolidates and distributes data and policies across different components and services within the customer platform 120, ensuring that data access rules and updates are consistently applied and managed throughout the system. Here, the term "federate" in the context refers to the process of linking and synchronizing separate databases, applications, or systems to allow them to function as a cohesive unit, sharing and managing data and policies across different components while maintaining a level of autonomy. In some embodiments, the federator 125 may ensure that the shared access control layer 127 is up to date with every object's data access rule for a user and/or for an organization. This real-time or near real-time update may ensure that the reports reflect the information that the users are entitled to, while preventing unauthorized access to sensitive data.

The shared access control layer 127 may be updated with an object's data access rule for a user. In some embodiments, the shared access control layer 127 is a data structure or a system component that stores and manages data access rules for multiple components of the extended network. In some embodiment, the shared access control layer 127 may include various types of network information, such as the identities of the organizations and users, the relationships between the organizations and users, the types and properties of the objects, and other relevant information. This network information may include details such as user roles, permissions, organizational hierarchies, and object classifications, and therefore facilitate efficient application of data access rules, ensuring that users can interact with the network's resources in a manner that is both secure and aligned with their roles and the organization's policies.

The data access rules may be federated to the shared access control layer 127 via a notification interface (e.g., an event based message interface, such as a publish and subscribe type event message framework, or a synchronous message interface, such as a REST-based API interface). The term "federate" refers to the process of integrating or synchronizing the data access rules from a first system, such as a core solution or a core system, to the shared access control layer 127, and/or then further distributing these rules to various extended components or systems. In some embodiments, the term "federate" may refer to a process of enforcing a centralized set of access control policies across different systems, components, or cloud tenants.

In some embodiments, the federating (e.g., the federation process) may be triggered by one or more events. In some embodiments, the one or more events may be an occurrence or a change in the system (e.g., the noted collaboration system or network which is also referred to herein as a business network) that triggers the federation of the data access rules, such as the creation, modification, or deletion of an object, the change of an organization's or a user's association with an object, or other relevant events.

In some embodiments, the data access rules further include data sensitivity rules which are added to the shared access control layer 127. Data sensitivity rules are a subset of data access rules that control access to data based on its sensitivity level. These rules are configured to protect sensitive data by restricting access based on various factors such as the type of data, the content of data, the source of data, the destination of data, the context of data usage, and other relevant factors. For example, data about financial transactions, personal information, or proprietary business information may be classified as high-sensitivity data, while data about public news, general market trends, or non-confidential business operations may be classified as low-sensitivity data. High-sensitivity data may be restricted to a limited number of users with high-level permissions, while low-sensitivity data may be accessible to a larger number of users with lower-level permissions.

The shared access control layer 127 may communicate with extended components residing in a separate cloud tenant to comply with the data access rules defined by the core system. The extended components can be any components that extend the functionality of the core system, such as custom applications (e.g., the custom application 128 in FIG. 1), reporting components (e.g., the reporting component 129 in FIG. 1), master data governance solutions (e.g., the master data governance solution 126 in FIG. 1), or any other components. The extended components may utilize the data access rules in the shared access control layer 127 to control the access to the objects by the organizations and users, thereby ensuring the consistency and security of the data access across the extended business network. In some cases, the data access rules may be configured to reflect changes in organizational roles, user permissions, and object classifications.

In some embodiments, upon modification to a data access rule, the system may be configured to generate a notification that includes one or more structured messages indicative of the modification. In some embodiments, the structured messages may include formatted data packets that contain specific information about the changes made to the data access rule. For example, the structured messages may include details such as the identity of the rule that was altered, the nature of the modification (e.g., addition, deletion, or update of permissions), the timestamp of when the change occurred, the user or process that initiated the change, and any relevant context that might be useful for the extended components to understand the modification. These messages are machine-readable so that they can be automatically processed by the receiving systems. These structured messages are then transmitted via a notification interface to the shared access control layer 127 to update the data access rules. This transmission may also trigger the federating process, wherein the updated data access rule is disseminated to the one or more extended components. This may ensure that all parts of the extended network are operating with the latest access control information, thereby maintaining data security and integrity across different systems and components. If, for example, an organization's role changes, such as from a supplier to a customer, the data access rules for the organization may be updated accordingly. Similarly, if a user's permissions change, such as from read-only access to read-write access, the data access rules for the user may be updated accordingly. Furthermore, if an object's classification changes, such as from a public object to a private object, the data access rules for the object may be updated accordingly. These updates are performed in real-time or near real-time, ensuring that the data access control in the extended business network is consistently accurate and up to date.

FIG. 3 depicts a flowchart diagram illustrating a process 300 for federated access control in a multi-tenant cloud-based business network in a cloud service, consistent with implementations of the current subject matter.

The process 300 may start with operation 302, wherein the system may define, based on at least one of an organization's association with an object and a user's association with the object, a data access rule. In some embodiments, the data access rules are defined and/or aggregated in a core system within the host platform 110 (discussed in connection with FIG. 1). In some embodiments, the data access rules may be based at least in part on an organization's association with an object and a user's association with the same object. For example, the data access rule may define that members of a finance department can access financial reports, but within this group, only managers have the permissions to edit or delete these reports. Meanwhile, employees outside the finance department may have no access to these reports, or they may have view-only access, depending on their specific roles or the projects in which they are involved.

Next, the process 300 may proceed to operation 304, wherein the system may generate a notification in response to a modification to the data access rule. In some embodiment, the notification may comprise one or more structured messages indicative of the modification to data access rule. In some embodiments, the structured messages may contain information such as the details of the rule change, the identity of the rule, the entities affected by the change, and the effective date and time of the rule modification. For example, a structured message may be read as "Access Rule Update: The 'Confidential Project Documents' access rule (ID: AccessRule456) has been modified. The 'Project Lead' role now has 'Edit' permissions. This change affects the 'Project X Financial Forecast' document. The new access permissions will become effective on Apr. 15, 2023, at 09:00 AM UTC". In some embodiments, the structured messages may be machine-readable, allowing automated systems to parse and act upon the information contained within them. In some embodiment, the system may generate one or more access control lists, wherein the one or more access control lists are responsive to the one or more structured messages and reflect the updated data access rule for the object. For example, the access control lists may include entries specifying which users or roles are granted or denied access to the object, the type of access permitted (e.g., read, write, edit, delete), and any conditions or constraints associated with the access (e.g., time-based restrictions, location-based restrictions).

Next, the process 300 may proceed to operation 306, wherein the system may transmit, via a notification interface, the one or more structured messages to a shared access control layer to update the data access rule. In some embodiments, the notification interface may be a communication channel that allows the system to send updates regarding data access rules to the shared access control layer 127, which is responsible for enforcing access policies across various components of the system. In some embodiments, the notification interface may utilize standard messaging protocols and formats to ensure compatibility and interoperability with the shared access control layer 127. The protocols may include the use of RESTful APIs, message queuing services, or event-driven architectures that support real-time or near real-time updates to access control rule. In some embodiments, the notification interface may include an event interface that triggers, in response to the modification to the data access rule, transmission of the one or more structured messages to the shared access control layer. In some embodiments, the event interface may notify relevant components within the system of the rule change. In some embodiments, the event interface may operate under various protocols, for example HTTP/HTTPS, WebSocket, AMQP, MQTT, RESTful APIs, gRPC, and Webhooks, so to ensure compatible communication across different system components.

Next, the process 300 may proceed to operation 308, wherein the system may federate the updated data access rule to one or more extended components. In some implementations, the extended components may reside in a cloud tenant that is separate from the cloud tenant hosting the core system. In some embodiment, the extended components may include various services or applications that require access to the object governed by the data access rule. In some implementations, federating the updated data access rule involves propagating the changes to all relevant components that rely on this rule for access control decisions. This operation may ensure that the updated data access rule is consistently enforced across the system, maintaining security and compliance with the organization's policies.

Next, the process 300 may proceed to operation 310, wherein the system may enforce the updated data access rule to control access to the object based on the updated data access rule. In some embodiments, the enforcement mechanism may include real-time checks against the updated access rules whenever an access request is made. The process 300 may ensure that the extended components residing in a separate cloud tenant can comply with the data access rules defined by the core system. This may provide the benefits that the data access control is consistently enforced across all components of the extended business network, regardless of where they reside in the cloud infrastructure. This approach provides a controlled access environment for business users, ensuring that they can access the information they are entitled to, while preventing unauthorized access to sensitive data.

Example 1: A method, comprising: defining, based on at least one of an organization's association with an object and a user's association with the object, a data access rule based on at least one of an organization's association with an object and a user's association with the object; generating a notification in response to a modification to the data access rule, wherein the notification comprises one or more structured messages indicative of the modification to data access rule; transmitting, via a notification interface, the one or more structured messages to a shared access control layer to update the data access rule; federating the updated data access rule to one or more extended components; and enforcing the updated data access rule to control access to the object based on the updated data access rule.

Example 2: The method of Example 1, the one or more extended components comprise a custom application with logic that extends a functionality of a core system.

Example 3: The method of any of Examples 1-2, the one or more extended components comprise a reporting component that generates reports based on data governed by the data access rule in a core system.

Example 4: The method of any of Examples 1-3, wherein the one or more extended components comprise a master data governance solution that integrates with a core system.

Example 5: The method of any of Examples 1-4, wherein the notification interface comprises an event interface that triggers, in response to the modification to the data access rule, transmission of the one or more structured messages to the shared access control layer.

Example 6: The method of any of Examples 1-5, wherein the shared access control layer updates the data access rule in real-time or near real-time to ensure compliance with the updated data access rule across the extended components.

Example 7: The method of any of Examples 1-6, further comprising: generating one or more access control lists, wherein the one or more access control lists are responsive to the one or more structured messages and reflect the updated data access rule for the object.

Example 8: A system, comprising: at least one data processor, at least one memory, at least one memory may store instructions that result in operations when executed by the at least one data processor, cause operations comprising: defining, based on at least one of an organization's association with an object and a user's association with the object, a data access rule based on at least one of an organization's association with an object and a user's association with the object; generating a notification in response to a modification to the data access rule, wherein the notification comprises one or more structured messages indicative of the modification to data access rule; transmitting, via a notification interface, the one or more structured messages to a shared access control layer to update the data access rule; federating the updated data access rule to one or more extended components; and enforcing the updated data access rule to control access to the object based on the updated data access rule.

Example 9: The system of Example 8, the one or more extended components comprise a custom application with logic that extends a functionality of a core system.

Example 10: The system of any of Examples 8-9, the one or more extended components comprise a reporting component that generates reports based on data governed by the data access rule in a core system.

Example 11: The system of any of Examples 8-10, wherein the one or more extended components comprise a master data governance solution that integrates with a core system.

Example 12: The system of any of Examples 8-11, wherein the notification interface comprises an event interface that triggers, in response to the modification to the data access rule, transmission of the one or more structured messages to the shared access control layer.

Example 13: The system of any of Examples 8-12, wherein the shared access control layer updates the data access rule in real-time or near real-time to ensure compliance with the updated data access rule across the extended components.

Example 14: The system of any of Examples 8-13, wherein the operations further comprise: generating one or more access control lists, wherein the one or more access control lists are responsive to the one or more structured messages and reflect the updated data access rule for the object.

Example 15: A non-transitory computer-readable medium storing instructions, which when executed by at least one data processor, result in operations comprising: defining, based on at least one of an organization's association with an object and a user's association with the object, a data access rule based on at least one of an organization's association with an object and a user's association with the object; generating a notification in response to a modification to the data access rule, wherein the notification comprises one or more structured messages indicative of the modification to data access rule; transmitting, via a notification interface, the one or more structured messages to a shared access control layer to update the data access rule; federating the updated data access rule to one or more extended components; and enforcing the updated data access rule to control access to the object based on the updated data access rule.

Example 16: The non-transitory computer-readable medium of Example 15, wherein the one or more extended components comprise a custom application with logic that extends a functionality of a core system.

Example 17: The non-transitory computer-readable medium of any of Examples 15-16, wherein the one or more extended components comprise a reporting component that generates reports based on data governed by the data access rule in a core system.

Example 18: The non-transitory computer-readable medium of any of Examples 15-17, wherein the one or more extended components comprise a master data governance solution that integrates with a core system.

Example 19: The non-transitory computer-readable medium of any of Examples 15-18, wherein the notification interface comprises an event interface that triggers, in response to the modification to the data access rule, transmission of the one or more structured messages to the shared access control layer.

Example 20: The non-transitory computer-readable medium of any of Examples 15-19, wherein the shared access control layer updates the data access rule in real-time or near real-time to ensure compliance with the updated data access rule across the extended components.

Figure 4:
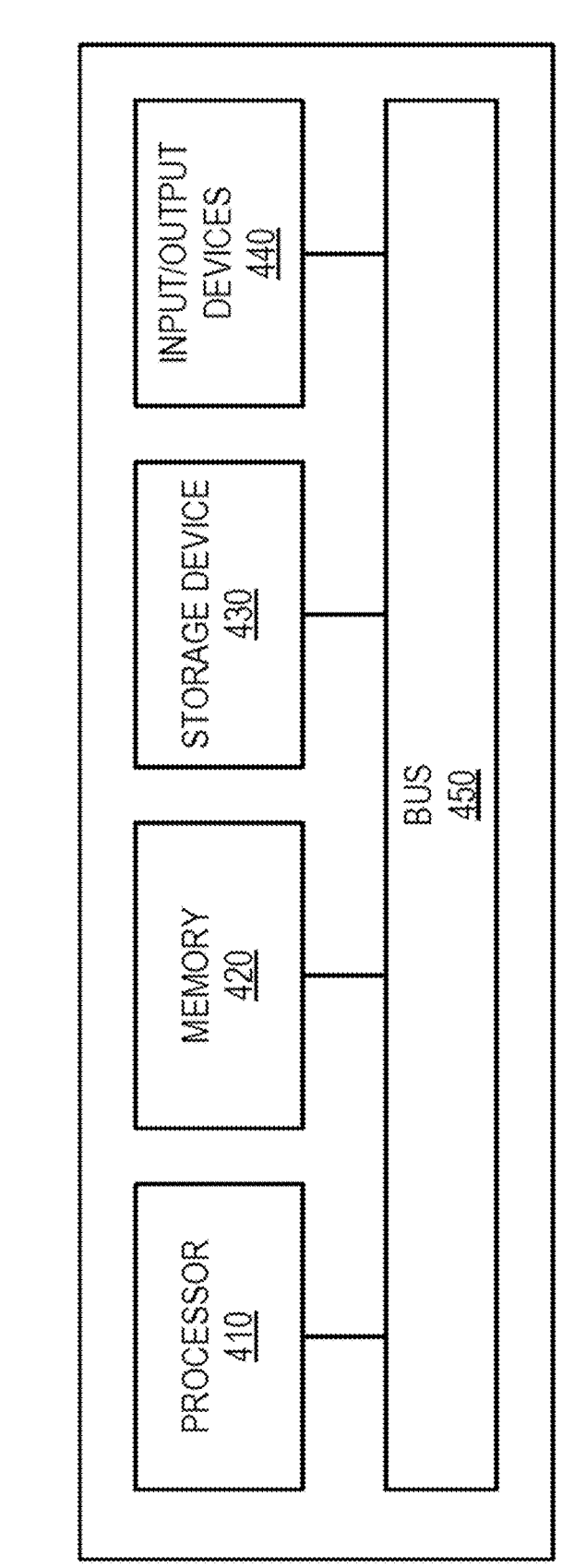
FIG. 4 depicts a block diagram illustrating a computing system, in accordance with some example embodiments.

FIG. 4 depicts a block diagram illustrating a computing system 400 consistent with implementations of the current subject matter. As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the host platform 110 and the customer platform 120. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A method comprising:
defining, based on an organization's association with an object or a user's association with the object, a data access rule;
generating a notification in response to a modification to the data access rule, wherein the notification comprises one or more structured messages indicative of the modification to the data access rule, wherein the one or more structured messages are generated in a machine-readable format to allow a receiving system to automatically process the one or more structured messages and parse information therein indicative of the modification to the data access rule and the one or more structured messages indicate an identity of the data access rule and one or more entities affected by the notification;
transmitting, via a notification interface, the one or more structured messages to a shared access control layer to update the data access rule;
federating the updated data access rule to one or more extended components; and
enforcing the updated data access rule to control access to the object based on the updated data access rule.

2. The method of claim 1, wherein the one or more extended components comprise one or more of: a custom application with logic that extends a functionality of a core system.

3. The method of claim 1, wherein the notification interface comprises an event interface that triggers, in response to the modification to the data access rule, transmission of the one or more structured messages to the shared access control layer.

4. The method of claim 1, wherein the shared access control layer updates the data access rule in real-time or near real-time to ensure compliance with the updated data access rule across the extended components.

5. The method of claim 1, further comprising: generating one or more access control lists, wherein the one or more access control lists are responsive to the one or more structured messages and reflect the updated data access rule for the object.

6. A system, comprising: at least one data processor; and at least one memory storing instructions, which when executed by the at least one data processor, cause operations comprising:
defining, based on an organization's association with an object or a user's association with the object, a data access rule;
generating a notification in response to a modification to the data access rule, wherein the notification comprises one or more structured messages indicative of the modification to the data access rule, wherein the one or more structured messages are generated in a machine-readable format to allow a receiving system to automatically process the one or more structured messages and parse information therein indicative of the modification to the data access rule and the one or more structured messages indicate an identity of the data access rule and one or more entities affected by the notification;
transmitting, via a notification interface, the one or more structured messages to a shared access control layer to update the data access rule;
federating the updated data access rule to one or more extended components; and
enforcing the updated data access rule to control access to the object based on the updated data access rule.

7. The system of claim 6, wherein the one or more extended components comprise a custom application with logic that extends a functionality of a core system.

8. The system of claim 6, wherein the one or more extended components comprise a reporting component that generates reports based on data governed by the data access rule in a core system.

9. The system of claim 6, wherein the one or more extended components comprise a master data governance solution that integrates with a core system.

10. The system of claim 6, wherein the notification interface comprises an event interface that triggers, in response to the modification to the data access rule, transmission of the one or more structured messages to the shared access control layer.

11. The system of claim 6, wherein the shared access control layer updates the data access rule in real-time or near real-time to ensure compliance with the updated data access rule across the extended components.

12. The system of claim 6, wherein the operations further comprise: generating one or more access control lists, wherein the one or more access control lists are responsive to the one or more structured messages and reflect the updated data access rule for the object.

13. A non-transitory computer-readable medium storing instructions, which when executed by at least one data processor, causes operations comprising:

defining, based on an organization's association with an object or a user's association with the object, a data access rule;

generating a notification in response to a modification to the data access rule, wherein the notification comprises one or more structured messages indicative of the modification to the data access rule, wherein the one or more structured messages are generated in a machine-readable format to allow a receiving system to automatically process the one or more structured messages and parse information therein indicative of the modification to the data access rule and the one or more structured messages indicate an identity of the data access rule and one or more entities affected by the notification;

transmitting, via a notification interface, the one or more structured messages to a shared access control layer to update the data access rule;

federating the updated data access rule to one or more extended components; and enforcing the updated data access rule to control access to the object based on the updated data access rule.

14. The non-transitory computer-readable medium of claim 13, wherein the one or more extended components comprise a custom application with logic that extends a functionality of a core system.

15. The non-transitory computer-readable medium of claim 13, wherein the one or more extended components comprise a reporting component that generates reports based on data governed by the data access rule in a core system.

16. The non-transitory computer-readable medium of claim 13, wherein the one or more extended components comprise a master data governance solution that integrates with a core system.

17. The non-transitory computer-readable medium of claim 13, wherein the notification interface comprises an event interface that triggers, in response to the modification to the data access rule, transmission of the one or more structured messages to the shared access control layer.

18. The non-transitory computer-readable medium of claim 13, wherein the shared access control layer updates the data access rule in real-time or near real-time to ensure compliance with the updated data access rule across the extended components.

* * * * *